Feb. 19, 1924.   1,484,083
A. C. ROEBUCK
MOTION PICTURE APPARATUS
Filed Feb. 23, 1921   3 Sheets-Sheet 2
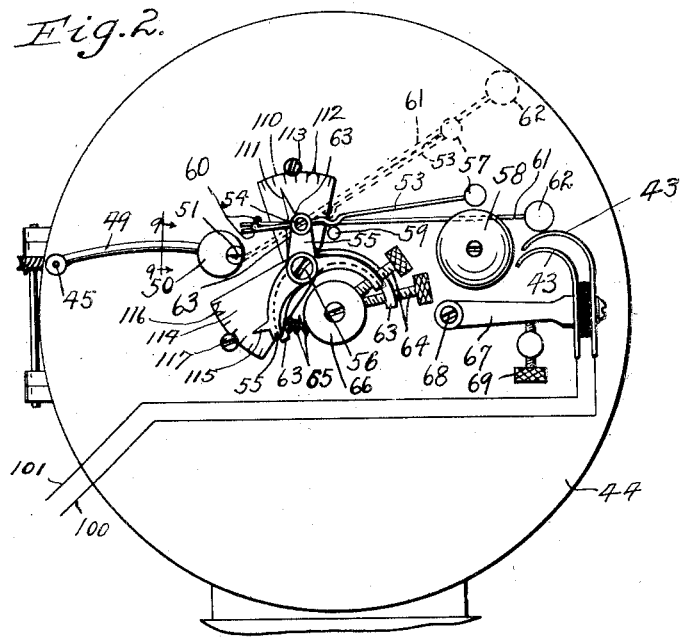
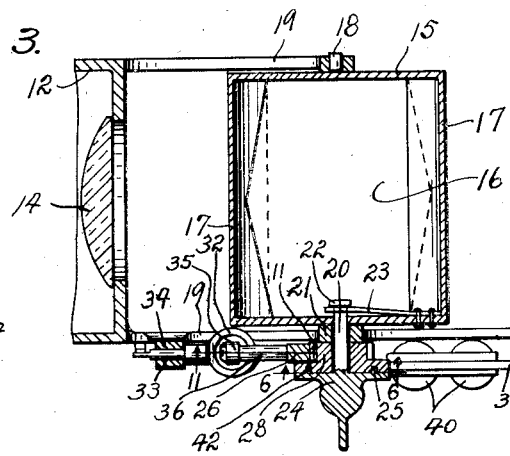
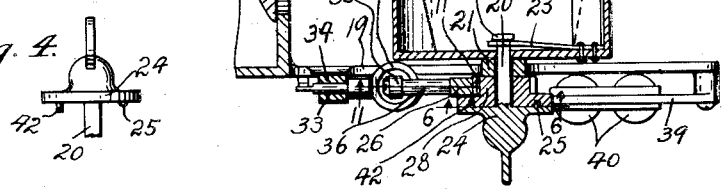
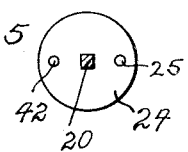
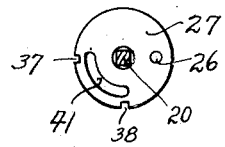
Inventor:
Alvah C. Roebuck
By Nissen & Crane
Attys.

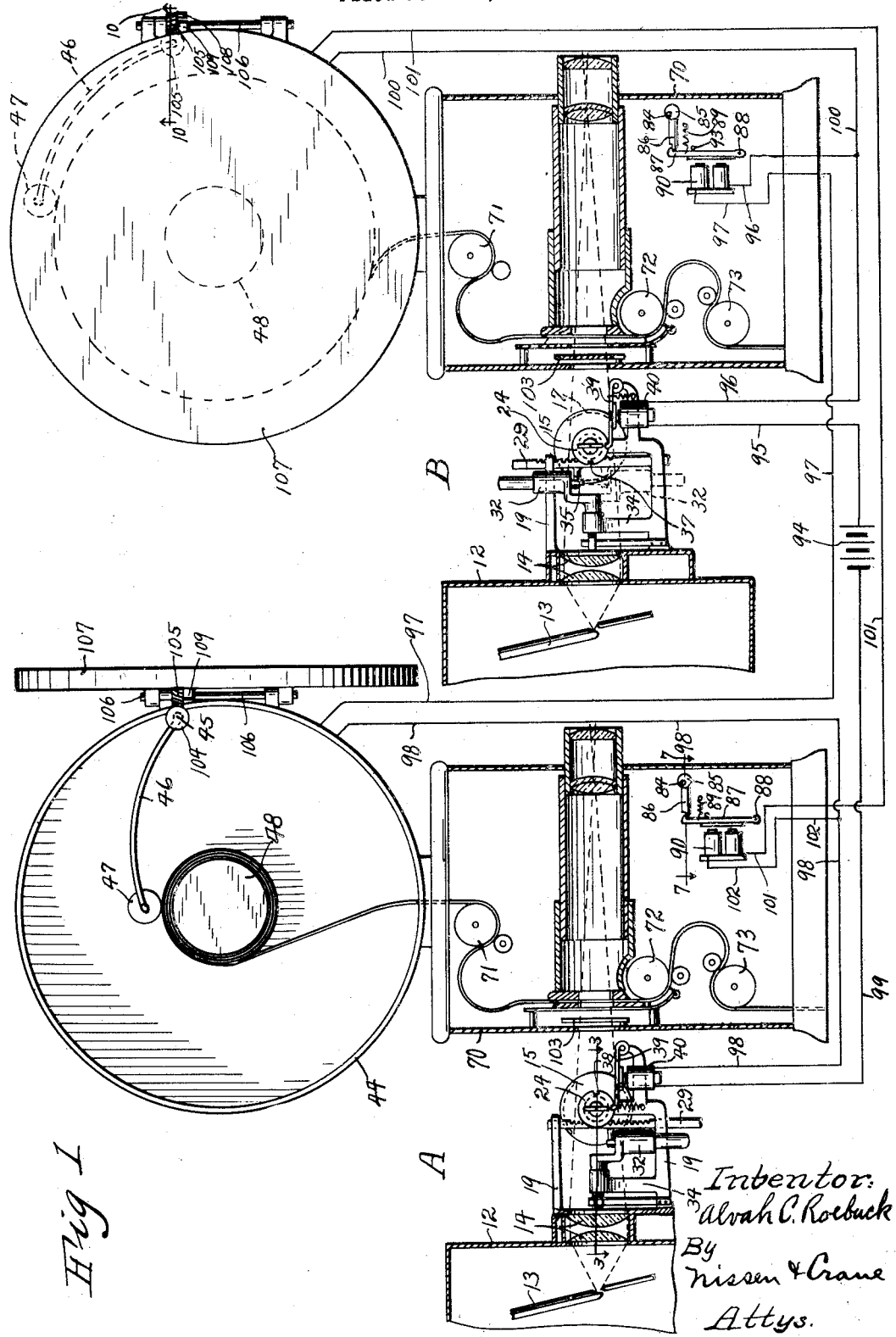

Feb. 19, 1924.
A. C. ROEBUCK
1,484,083
MOTION PICTURE APPARATUS
Filed Feb. 23, 1921   3 Sheets-Sheet 3
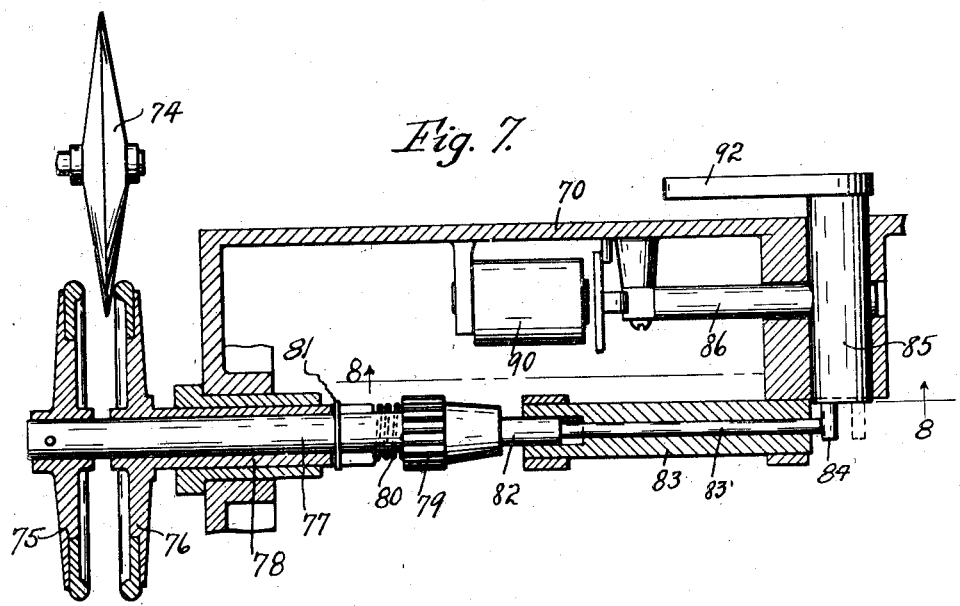
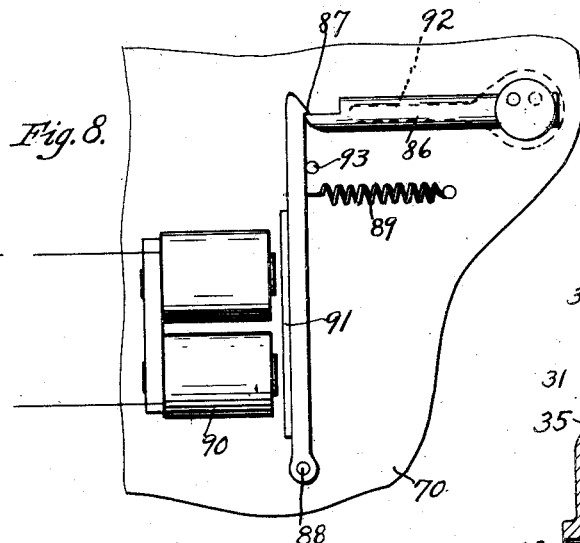
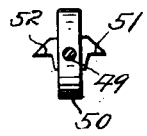
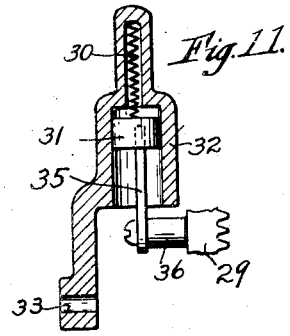
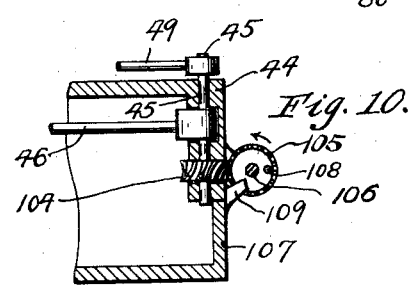

Patented Feb. 19, 1924.

1,484,083

UNITED STATES PATENT OFFICE.

ALVAH C. ROEBUCK, OF CHICAGO, ILLINOIS.

MOTION-PICTURE APPARATUS.

Application filed February 23, 1921. Serial No. 447,010.

*To all whom it may concern:*

Be it known that I, ALVAH C. ROEBUCK, a citizen of the United States, residing at Chicago, in the county of Cook and State of Illinois, have invented certain new and useful Improvements in Motion-Picture Apparatus, of which the following is a specification.

My invention relates to motion picture apparatus and has for one of its objects the provision of an alarm to be actuated at a predetermined distance from the end of a reel of film in a motion picture machine.

A further object is the provision of change-over shutters in connected moving picture machines which may take the place of the usual "dowser shutter," the name usually applied to the shutter placed between the lamp house and film-moving apparatus of the machine.

A still further object is the provision of an automatic change-over device for a plurality of motion picture machines so as to dissolve or blend the picture from one of said machines into the picture of the other without permitting a blank light or darkness on the screen.

Another object is the provision of an arrangement whereby the arm which governs an alarm or change-over mechanism will be automatically raised in the film case when the door of the latter is raised to permit the free passage of a film reel out of the case or into the latter. Also, in such a device the arm will be automatically lowered into operative position upon closing the film case door.

Other objects will appear hereinafter.

An embodiment of my invention is illustrated in the accompanying drawings, forming a part of this specification, and in which Fig. 1 is a side view, partially in section and partially diagrammatical, of a plurality of motion picture machines embodying my invention;

Fig. 2 is a view of the reverse side of one of the film reel cases shown in Fig. 1;

Fig. 3 is an enlarged section taken on line 3—3 of Fig. 1;

Fig. 4 is a plan view of a thumb wheel used in the construction;

Fig. 5 is a view looking at the under side of the thumb wheel shown in Fig. 4;

Fig. 6 is a view looking as from line 6—6 in Fig. 3 at a disc used in the construction;

Fig. 7 is a fragmental horizontal section taken as on line 7—7 in Fig. 1;

Fig. 8 is a view taken as on line 8—8 in Fig. 7;

Fig. 9 is an enlarged section taken as on line 9—9 in Fig. 2;

Fig. 10 is an enlarged section taken as on line 10—10 in Fig. 1; and

Fig. 11 is an enlarged fragmental section taken as on line 11—11 in Fig. 3.

Referring more particularly to the drawings, in Fig. 1 I have indicated a motion picture apparatus comprising two projecting machines connected together so as to dissolve the picture of one machine into that of the other automatically. The film-moving and light producing apparatus may both be that of usual construction or of any preferred design. In such constructions a lamp house 12 has a source of light 13 mounted therein. At one side of the lamp house is mounted a pair of condensers 14 in the light path of the machine. In the usual construction there is what is called a "dowser" shutter in the light path outside of said condensers 14. In my improvement I have replaced the ordinary dowser shutter, not shown, with an improved shutter which comprises a drum 15 having portions of its peripheral wall cut away, as indicated in Fig. 3. Openings 16 in said wall are of substantially the same widths as blades or members 17. At least one pair of opposite edges of members 17 have somewhat V-shaped notches therein so that light will be cut off from the margins of the light path before that at the center, in order to facilitate dissolving or blending the pictures.

The shutters 15 may be mounted and operated in any desirable manner. I have indicated a stud 18 at the axis of one end of said shutter journaled in a bearing of frame 19, and the latter secured to housing 12 in any desirable manner.

The other end of the shutter has a non-round axial opening in which is slidably mounted a similarly shaped pin 20. Said pin is journaled in a lug 21 on a portion of frame 19. The inner end of pin 20 has a head 22 thereon with a spring 23 tending to draw the pin into said shutter. At the outer end of the pin is fixed a thumb wheel 24.

On one side of the thumb wheel 24 is a lug 25 which engages a recess 26 in an enlarged hub 27 of a pinion 28 and is the driving means between said pinion and shutter. A rack bar 29 is slidably mounted in frame 19 and meshes with the pinion 28. I have indicated a means for operating the rack bar 29 in opposite directions which consists of a spring 30 pressing against a piston 31 in a cylinder 32, and the latter having an arm pivoted as at 33 to a part 34 of frame 19. The piston 31 is connected through a rod 35 with a lug 36 on rack bar 29. The axis of pivot point 33 is preferably in the plane in which the axis of pin 20 is disposed but at a right angle thereto so that upon swinging the cylinder 32 the spring may operate with equal force in both directions. The piston and cylinder arrangement provides a dash-pot adapted to retard the action of spring 30 so as to cause the shutter to open and close slowly.

The hub 27 is provided with two notches 37 and 38 at substantially 90 degrees apart so as to limit the oscillatory movements of the shutter to substantially a quarter of a revolution. A spring-pressed lever 39 has a projection adapted to engage said notches and is disengaged from said notches by an electro-magnet 40.

It may be desired to close or open the shutter at some times without disturbing the electro-magnet 40, and in such cases the thumb wheel 24 can be pulled out against the influence of spring 23 to free projection 25 from recess 26, thereby permitting the pin 20 to be moved manually. In order to limit the manual movement of pin 20 and consequently shutter 15, an arcuate slot 41 of substantially 90 degrees is provided in hub 27 and a pin 42 longer than projection 25 is formed on thumb wheel 24 so that when the thumb wheel is pulled out sufficiently far to free projection 25, pin 42 will still be in slot 41 and thereby limit the oscillatory movement of the shutter to 90 degrees.

The electro-magnets 40 on the different machines may be operated in any desirable manner, such as by a switch 43 indicated in Fig. 2, with the corresponding ends of such switch members suitably mounted on reel case 44.

Journaled in a suitable portion of the case 44 is a shaft 45 having an arm 46 fixed thereon in case 44. A roller 47 may be provided on the free end of arm 46 adapted to ride on film on a reel 48 mounted in said case. On the outer side of the case is an arm 49 fixed on shaft 45 and having a weight 50 at its free end. The roller 47 and weight 50 hold the arm 46 in engagement with the film when the door of the case is closed.

On opposite sides of weight 50 are two trip members 51 and 52. One of the trip members is adapted to engage a lever 53 pivoted as at 54 on a yoke 55, and the latter pivoted as at 56 on case 44. The lever 53 may be of spring wire or other flexible material and provided with a clapper 57 at its outer end adapted to engage a gong or other signal device 58. A pin 59 is provided on case 44 to normally hold the clapper 57 out of engagement with the gong and permit flexing of the lever 53 to sound the gong when the lever slips off of member 51. An elbow joint 60 may be provided in lever 53 to permit trip member 51 to pass upwardly by the adjacent end of said lever.

A lever 61 similar to lever 53 is provided with a weight 62 and pivoted on a yoke 63 similar to yoke 55. The lever 61 may also be provided with an elbow joint 60 to permit trip member 52 to pass upwardly by the adjacent end of lever 61. Said lever 61 is adapted to engage pin 59 when released by trip member 52 upon downward movement of the latter by said lever and cause weight 62 to engage upper contact of switch 43 and bend the latter downwardly into engagement with the lower contact of said switch member, thereby closing said switch. The pin 59 is adapted to hold the weight 62 normally out of engagement with upper contact of switch 43 so as to maintain the switch open, except for a short time after weight 62 falls.

The yokes 55 and 63 may be provided with screws 64 for adjusting them to vary the pivotal points of levers 53 and 61 with respect to the trip members 51 and 52 so as to vary the times said gong and switch will be operated. Springs 65 press against the yokes 55 and 63 and a lug 66 on case 44 to keep the screws 64 against said lug 66. The switch 43 may be moved toward and away from weight 62 in any desirable manner, such as by mounting the switch members on an arm 67 pivoted as at 68 on case 44 and supported in an adjustable position by a screw 69 mounted on said case.

In the light path of each of the devices is film-moving apparatus, which in the present instance comprises a case 70 arranged with its light opening at the optical axis of the light from the condensers 14. The film-moving mechanism may be of any approved construction and is provided with the usual feed sprocket 71, intermittent sprocket 72, and take-up sprocket 73, and these sprockets may be operated in the usual manner or as desired. In my co-pending application, Serial No. 388,926, filed June 14, 1920, I have indicated a form of driving mechanism substantially the same as that indicated in Fig. 7 herein. In this form a motor driven friction gear 74 is adapted to drive friction gears 75 and 76. The gear 75 is fixed on shaft 77 and gear 76 fixed on a sleeve 78 telescoped on said shaft. A pinion 79 is fixed on shaft 77 and is adapted to drive the sprockets already referred to through mechanism well known and as set forth in my above-mentioned application. A spring 80 presses against pinion 79 and an adjacent end of sleeve 78 tending to clamp friction gear 74 between gears 75 and 76. The shaft 77 and sleeve 78 may be connected together in any desirable manner, such as by a slot in sleeve 78 and a pin 81 extending through said shaft and slot.

The shaft 77 has a restricted portion 82 mounted in a bearing 83 in housing 70. Longitudinally slidable in said bearing 83 is a pin 83' which engages a pin 84 on a shaft 85 journaled in a suitable portion of housing 70. The shaft 85 carries an arm 86 and the housing 70 is suitably slotted to permit oscillation of arm 86.

A lever 87 has a catch at one end adapted to engage arm 86 and pivoted as at 88 to housing 70. A spring 89 tends to pull lever 87 toward arm 86, and an electro-magnet 90 is arranged to operate through its armature 91 to disengage the lever 87 from arm 86. When lever 87 is disengaged from arm 86, spring 80 will bring the gears 75 and 76 into engagement with driving gear 74 and move pin 84 to its dotted line position in Fig. 7. A hand lever 92 is attached to a portion of shaft 85 so as to move arm 86 back to locking engagement with lever 87, and this locking operation is facilitated by the beveled adjacent portions of said arm and lever, as clearly indicated in Fig. 8. A pin 93 is provided in housing 70 so as to hold the lever 87 in position to be engaged by arm 86 when lever 92 is operated.

An electric battery 94 may be connected with the electrical circuits for operating the electrical devices already mentioned, or these circuits may be energized in any desirable manner. The arrangement of the circuits may be one wire 95 leading from the battery 94 to the electro-magnet 40 on machine B of Fig. 1, a wire 96 leading from said magnet to magnet 90 of said machine B, a wire 97 leading from said magnet 90 to the upper contact of switch 43 in machine A of Fig. 1, a wire 98 leading from the lower contact of said electrical switch to electro-magnet 40 of machine A, and a wire 99 leading from said magnet 40 back to battery 94, thus completing one electrical circuit.

The other electrical circuit starting from battery 94 runs through wire 95, magnet 40 of machine B, part of wire 96, wire 100 to the lower contact of switch 43 to machine B, from the upper contact of machine B through wire 101 to magnet 90 of machine A through wire 102 to wire 98 and through a part of the latter to magnet 40 of machine A and then through wire 99 back to battery 94.

A fire shutter 103 is provided in each film-moving apparatus in housing 70 in the positions indicated in Fig. 1 and may be operated in any desirable manner, or as set forth in my copending application, Serial No. 421,784, filed November 4, 1920. Such shutters are usually operated by the film-moving mechanism and automatically opened and closed while the film-moving apparatus is getting up to speed, and closing down from the speed of operation.

On shaft 45 is fixed a spiral gear 104 which meshes with a similar gear 105 on a pin 106 of the hinge of door 107, and the latter is the door for case 44. The gear 105 has a projection 108 depending therefrom and adapted to engage a lug 109 on door 107 when said door is opened a predetermined amount so that arm 46 is free to move up and down when door 107 is closed; and when said door is opened a predetermined amount, lug 109 will engage projection 108 and raise the arm 46 from its position shown in machine A to that shown in machine B of Fig. 1, and upon closing the door, said arm 46 will be released for engagement with the film.

In operating my improved alarm and automatically dissolving apparatus, when the film has run down to a predetermined amount on reel 48 in machine A, trip 51 will have raised lever 53 and permit the latter to drop and sound gong 58. This attracts the operator's attention so that he can get the light 13 in machine B in operative condition and also start his motor operating gear 74. When the film has run on down for another predetermined amount, trip 52 has raised lever 61 and permits it to fall so that weight 62 flexes upper contact of switch 43 into engagement with the lower contact, thereby closing the circuit in a manner to operate electro-magnets 40 in both machines, and electro-magnet 90 in machine B. It will be apparent that shutter 15 in machine B will have been previously closed, and machine A which has been operating, will be open; then upon operating magnets 40, levers 39 will each be disengaged from one of the notches in a hub 27, permitting both springs 30 to operate their rack bars and close shutter 15 in machine A and open shutter 15 in machine B. The dashpot arrangements in these devices will retard such opening and closing of said shutters so as to facilitate dissolving the picture of machine A into that of machine B.

The fire shutter 103 in machine B will have been opened by the film-moving mechanism coming up to operative speed before the shutters 15 in both machines have operated sufficiently to interfere with dissolving of the pictures. Reference to applicant's co-pending application, Serial No. 388,926, above referred to, will explain the operation of shutter 103. The only thing required for the operator to do in the automatic dissolving of picture of machine A into that of machine B was to have gotten his light in machine B in operative condition, which in ordinary practice must be done by hand. Also, to start up his motor which drives gear 74. It will be apparent that the motor driving gear 74 may be connected in the circuit with magnet 90 by a suitable switch for automatically starting the motor, if desired.

When the film on machine B has run down to a predetermined amount, the gong 58 on said machine will be sounded so as to give the operator time to get his light and motor in operation on machine A again. While the film has been running through machine B the operator will have changed his film in machine A and have it set ready for the change-over or dissolving, as above described.

When setting the shutter operating device on either machine, all that is required is for the operator to move the cylinder 32 from its full line position to the dotted line position indicated in machine B, Fig. 1. The movement of cylinder 32, as just described, compresses spring 30, and when the shutter mechanism is freed, by locking lever 39, the spring operates the rack bar as above mentioned and is moved to its relaxed condition. The manual swinging of the cylinder 32 back to its starting position compresses the spring again and places it in condition for another operation.

It is desirable in some instances to provide means for setting the yokes 55 and 63 so that one may know when the alarm and switch are going to be operated. A simple means for this purpose may consist of a thin plate 110 pivoted about the screw or pin 56 so as to swing about the pivotal point of yoke 63. Said yoke 63 may be provided with a pointer 111 adapted to cooperate with graduations 112 on plate 110. The plate 110 may be held in different positions of adjustment by a screw 113 secured in case 44.

The yoke 55 may have an indicating means comprising a plate 114 similar to plate 110 and pivoted on the same axis. A pointer 115 is provided on yoke 55 for cooperating with graduations 116 on plate 114. Said plate may be held in its positions of adjustment by a screw 117 in case 44. The plates 110 and 114 are preferably held against the case 44 by the yokes 63 and 55. With this arrangement the operator may set his mechanism so that the alarm 58 will be sounded and the switch 48 will be closed, at a desirable time, before the last end of the film has passed from the reel, and with these graduations and pointers he will be able to know just how to set the yokes 55 and 63 to accomplish this.

I claim:—

1. Motion picture apparatus comprising a shutter pivotally mounted; a reciprocatory member connected with the shutter for rotating the latter; a spring connected with the reciprocatory member adapted to move the latter; means for shifting the spring and causing the latter to act on the reciprocatory member alternately in opposite directions; and a lock for holding the shutter against the influence of said spring.

2. Motion picture apparatus comprising a plurality of projecting machines each having a shutter therein; shutter operating means connected with each shutter, means locking the shutters against movements; and means for simultaneously releasing said operating means.

3. Motion picture apparatus comprising a shutter pivotally mounted; a reciprocatory member connected with the shutter for rotating the latter; a spring connected with the reciprocatory member adapted to move the latter; means for shifting the spring and causing the latter to act on the reciprocatory member alternately in opposite directions; a lock for holding the shutter against the influence of said spring; and means for retarding the force of the spring on the reciprocatory member.

4. Motion picture apparatus comprising a plurality of projecting machines, each having a shutter and film reel therein, shutter operating means connected with each shutter; locks for locking each shutter operating means; and means controlled by a film on one of said reels adapted to unlock said shutter operating means.

5. Motion picture apparatus comprising a plurality of projecting machines, each having a shutter and a film reel therein; shutter operating means connected with each shutter; a lock connected with each shutter operating means; electro-magnets associated with said locks and adapted to unlock the shutter operating means; a lever controlled by a film on one of said reels; an electrical switch connected with said lever; and an electrical circuit connecting said switch and electro-magnets.

6. Motion picture apparatus comprising a plurality of projecting machines; a shutter in the light path of each machine; a spring operatively connected with each shutter, one spring tending to open one shutter and the other spring tending to close the other shutter; a catch locking each shutter against the influence of its spring; and means for unlocking said catches simultaneously.

7. Motion picture apparatus comprising a plurality of projecting machines, each having a spring-operated shutter and a driving means associated therewith; a lock associated with each of said shutters and each driving means; an unlocking device connected with each of said locks; an electrical switch associated with each of said machines; and an electrical circuit including one of said switches and the unlocking devices connected with one of said driving means and both of said shutters.

8. Motion picture apparatus comprising two projecting machines, each having a pivotally mounted shutter, an operating means connected with said shutter, and a lock locking the shutter against the influence of said operating means, one of said shutters being normally open and the other shutter being normally closed; a roll of film in one of said machines; and controlling means connected with said roll of films and both of said locks, adapted to unlock the latter simultaneously when the roll of film reaches a predetermined size.

9. Motion picture apparatus comprising a film reel; a pivoted arm having its free end adapted to ride on a film in said reel; shutter mechanism associated with the film reel; means for operating the shutter mechanism; a lock rendering the shutter mechanism inoperative; and means connected with the arm for unlocking said lock.

10. Motion picture apparatus comprising a film reel; a pivoted arm having its free end adapted to ride on the outer periphery of a film in said reel; an alarm connected with said arm; shutter mechanism associated with the film reel; means for operating the shutter mechanism; a lock rendering the shutter mechanism inoperative; and means connected with the arm for operating said alarm and unlocking said lock.

11. Motion picture apparatus comprising a film reel case; an arm pivoted on said case and under the control of a film in said case; a weighted lever having one end in the path of said arm; and an alarm device in the path of an end of said lever.

12. Motion picture apparatus comprising a film reel case; an arm pivoted on said case and under the control of a film in said case; a lever pivoted to said case and having an end in the path of said arm; means for varying the distance between the pivots of said lever and arm; and an alarm associated with and operable by said lever.

13. Motion picture apparatus comprising a film reel case; an arm pivoted on said case and under the control of a film in said case; a lid hinged to said case; a connection between the arm and lid causing the latter to raise the arm upon opening of said lid; and an alarm device associated with the arm.

14. Motion picture apparatus comprising a film reel case; two shafts journaled in the case; gears connecting the shafts together; an arm fixed on one shaft and under the control of a film in said case; a lid pivoted on the other shaft; an operative connection between one of the gears and the lid; and an alarm associated with said arm.

15. Motion picture apparatus comprising a film reel case; an arm pivoted on the case and controlled by a film in the latter; two levers pivotally mounted and operatively associated with said arm; an alarm associated with one lever; an electrical switch associated with the other lever; an electrical circuit including said switch; and means for shifting the pivots of said levers independently of each other and with respect to said arm.

16. Motion picture apparatus comprising a film reel case; a weighted arm pivoted on the case and controlled by a film in the later; two levers pivotally mounted and operatively associated with said arm; an alarm associated with one lever; an electrical switch associated with the other lever; a shutter; operative means connected with said shutter; a lock for holding said operating means in inoperative condition; an electro-magnet connected with and adapted to unlock said lock; an electrical circuit enclosing said switch and electro-magnet; and means for moving the pivots of said levers with respect to said arm.

17. Motion picture apparatus comprising a film reel case; a weighted lever pivoted on the case and controlled by a film in the latter; a lever having one end in the path of said arm; an electrical switch comprising two resilient members in the path of said lever; means for moving the switch relative to said lever; and an electrical circuit including said switch.

18. Motion picture apparatus comprising a film reel case; a weighted arm pivoted on the case and controlled by a film in the latter; a weighted lever having one end in the path of said arm and formed of resilient material; an electrical switch in the path of said lever; a stop in the path of said lever positioned so as to normally hold the lever out of engagement with said switch and permit flexing of the lever to engage said switch; and an electrical circuit including said switch.

19. Motion picture apparatus comprising a plurality of projecting machines, each having a shutter and film reel therein; a spring operatively connected with each shutter, locks for locking each shutter against the influence of said spring; and means controlled by the amount of film on one of said reels adapted to operate said locks.

20. Motion picture apparatus comprising a film reel case; a trip member pivoted on the case and controlled by film in said case; a yoke on said case; a lever pivoted on said yoke and adapted to be operated by said trip member; means for varying the distance between said yoke and said trip member; and means for indicating the relation between said yoke and trip member.

21. Motion picture apparatus comprising a film reel case; a trip member pivoted on the case and controlled by film in said case; a yoke pivoted on said case; a lever pivoted on the yoke and adapted for operation by said trip member; an alarm associated with said lever; a graduated plate pivoted on the axis of said yoke; and a pointer on said yoke adapted to cooperate with said graduated plate.

22. Motion picture apparatus comprising a shutter pivotally mounted; a bar mounted for back and forth movements and operatively connected with the shutter for rotating the latter; a spring connected to said bar adjacent the middle of the latter; a member attached to the spring and mounted so as to shift the spring to opposite sides of the middle of said bar; and a lock for locking the shutter against rotation.

23. Motion picture apparatus comprising a shutter pivotally mounted; a bar mounted for back and forth movements and operatively connected with the shutter for rotating the latter; a spring connected to said bar adjacent the middle of the latter; a member attached to the spring and mounted so as to shift the spring to opposite sides of the middle of said bar; a lock for locking the shutter against rotation; electrically-operated means connected with said lock for unlocking the latter; a roll of film associated with the shutter; and means engaging the film connected with the lock for controlling the operation of said electrically-operated means.

24. Motion picture apparatus comprising a shutter pivotally mounted; a gear attached to the shutter at the axis of the latter; a rack bar meshing with said gear; a cylinder mounted for swinging movement to opposite sides of the middle of said rack bar; a piston in said cylinder; a piston rod connecting the piston with the middle part of said rack bar; and a spring between said piston and one end of said cylinder.

25. Motion picture apparatus comprising a shutter pivotally mounted; a gear attached to the shutter at the axis of the latter; a rack bar meshing with said gear; a cylinder mounted for swinging movement to opposite sides of the middle of said rack bar; a piston in said cylinder; a piston rod connecting the piston with the middle part of said rack bar; a spring between said piston and one end of said cylinder; a hub on said gear having a notch therein; and a locking member engaging said notch for holding the gear against rotary movement.

In testimony whereof I have signed my name to this specification on this 17th day of February, A. D. 1921.

ALVAH C. ROEBUCK.